United States Patent [19]

Brandt

[11] Patent Number: 5,458,359

[45] Date of Patent: Oct. 17, 1995

[54] MISSING LINK SWIVEL FOR FOUR-LINK RIGID AXLE SUSPENSIONS

[76] Inventor: Larry A. Brandt, P.O. Box 60391, Reno, Nev. 89506

[21] Appl. No.: 287,528

[22] Filed: Aug. 8, 1994

[51] Int. Cl.⁶ .................................................. B60G 15/00
[52] U.S. Cl. ........................................... 280/673; 280/675
[58] Field of Search ................................. 280/96.1, 673, 280/675

[56] References Cited

U.S. PATENT DOCUMENTS

| | | | |
|---|---|---|---|
| 3,497,233 | 2/1970 | Bolaski, Jr. | 280/96.2 |
| 3,602,524 | 8/1971 | Rutzenhofer | 280/112 A |
| 3,704,897 | 12/1972 | Bagge et al. | 280/91 |
| 4,341,397 | 7/1982 | Morimura et al. | 280/688 |
| 4,410,201 | 10/1983 | Iijima et al. | 280/688 |
| 4,744,586 | 5/1988 | Shibihata et al. | 280/661 |
| 5,000,476 | 3/1991 | Lindorfer et al. | 280/673 |
| 5,108,127 | 4/1992 | Chandler | 280/675 |
| 5,112,078 | 5/1992 | Galazin et al. | 280/711 |
| 5,338,055 | 8/1994 | Mauz | 280/673 |

FOREIGN PATENT DOCUMENTS

| | | |
|---|---|---|
| 2-102813 | 4/1990 | Japan . |
| 4-85122 | 3/1992 | Japan . |

OTHER PUBLICATIONS

Fred Puhn, "How to Make Your Car Handle," c 1981, pp. 33, 34, & 152 published by H. P. Books, many types of suspensions for rear powered rigid axle illustrated.

Catalogue: T.C.I. Engineering Inc., 1992, pp. 6, 7, & 23; 1416 West Brooks Street Ontario, Calif. 91762 Four-links for front and rear rigid axles.

Catalogue: Flexi Flyer Ind. Inc., 1992, p. 13, "Torque Link"; P.O. Box 34641 Phoenix, Ariz. 85067.

Catalogue: Chassis Engineering Inc. 1994, pp. 6 & 9; 861 Jupiter Park Drive Jupiter, Fla. 33458 Ladder bar & four-link suspensions for drag racing.

*Primary Examiner*—Kenneth R. Rice

[57] ABSTRACT

In a four-link suspension for a ground vehicle, of the type which utilizes a lower pair and an upper pair of connecting links to attach and stabilize a rigid axle of a vehicle in fore, aft, and rotational directions. The improvement to which comprises the addition of a swivel arm, having two ends, and interposed between a pair of links at one end, so that, one end of each link attaches to a corresponding end of swivel arm. The swivel arm has a center pivot axis and attached base mount, which is securely affixed to the approximate middle laterally of the rigid axle or chassis, whichever location is the most desireable to mount the swivel. When looked at from above the impression created is that of a V or U shape from the pair of links and the swivel where they connect. The general purpose of the swivel is to eliminate any bind in the suspension connecting links by permitting one link of the pair to push past, and the other link to pull away from, the swivel center axis. This motion allows the rigid axle to tilt freely from side to side in relation to the vehicle's body, through the full range of vertical suspension travel, when the vehicle is traversing uneven terrain, or leaning when rouning a curve. Plus, the swivel allows for almost infinite mounting angles and lengths of the connecting links, for frame, chassis, or body mounting location considerations, or high performance setup, tuning, and adjustment.

13 Claims, 9 Drawing Sheets

MISSING LINK SWIVEL FOR FOUR-LINK RIGID AXLE SUSPENSIONS

BACKGROUND

1. Field of Invention

This invention relates to vehicle suspension systems, specifically for attaching a rigid axle of the vehicle to it's frame, chassis, or body by way of multiple, pivotal, connecting links, arms, tubes, bars, etc. to stabilize the axle in fore, aft, and rotational directions.

2. Description of Prior Art

It is well known, one method to attach a rigid axle, either powered or not, to the frame, chassis, or body of a vehicle is by using a four-link type of connecting arm suspension to stabilize an axle against forces acting on it in fore, aft, and rotational directions.

The four-link suspension comprises four axle to frame connecting links. One end of each link is pivotally attached to the frame, chassis, or body of the vehicle and the other end of each link is pivotally attached to a rigid axle of the vehicle. Two link ends are pivotally attached above the axle centerline and two link ends are pivotally attached below the axle centerline.

The problem of nearly if not all four-link suspensions is that in order for a vehicle to lean from side to side, or traverse a bump, or incline a surface at an uneven angle, the two connecting links above the axle have to be mounted at an essentially parallel angle to the two connecting links below the axle, and all links need to be of equal length in order for the suspension to not bind up. When a four-link suspension binds it means one end of a rigid axle cannot move up or down independently of the other end. Incidentally many vehicle's chassis or bodies do not enable the use of parallel and equal length axle connecting links.

In addition, the consequences resulting from a suspension that continually binds can be dangerous. Especially in heavy equipment and racing applications,suspension bind creates undesireable stresses on the suspension components leading to fatigue,fracture, and eventual failure of suspension parts, attaching bracketry, or framework of the vehicle.

Most vehicle manufacturers, primarily of automobiles, alleviate this problem of suspension bind by utilizing large rubber or elastomeric bushings at all connecting link ends. Thus, allowing one end of an axle to move up or down within a very limited range of the other end, but at a high deformation rate and relatively short life span of the rubber or elastomeric bushing.

Heavy duty vehicles and racing vehicles are subject to much more severe loads and forces acting on the vehicle chassis. The application of elastomeric bushings or bearings on these type of vehicles is just about nonexistent.

Many automobile and truck,high performance and racing, suspension designers and chief mechanics like to experiment with different angles and lengths of the frame to axle links, in order to get the vehicle to react and handle better under acceleration, deceleration and braking, cornering, and bump forces. But, the problem of suspension bind can then be manifest especially in the four-link type suspension.

To solve this problem of suspension bind and be able to use a suitable bearing of a less deformable or compressable material than an elastomer at the link ends (optimumly bearings made of a metal or alloy) the three -link suspension was conceived.

The three-link suspension has no bind whatsoever when one end of a rigid axle is moved up or down without the other end doing the same, while utilizing spherical rod end bearings at all connecting link ends. Such bearings commonly made out of steel, or other metal, or an alloy, or combination.

The three-link suspension is like the four-link except, for example, of the upper pair of links, one link is omitted and the other link is usually relocated between the lower pair of links laterally extending in the direction lengthwise of the vehicle and now becomes the single upper link.

Some problems with the three-link suspension are that it is generally not as strong, as safe, or as versatile with regards to setup of angles, degrees of incline, or chassis and axle mounting locations of the links, as the four-link is.

Often it is not possible to mount a third link near the lateral center of a vehicle as there likely wont be a sturdy section of the chassis to accept a bracket for the third link attaching end. Especially, when considering a high torque or horsepower engine transmitting power to the axle.

Another drawback of the three-link suspension, when applied to a powered axle, is the lack of adjustability becomes apparant as the driveshaft needed to transmit power to the axle is usually in the way. Thus, making it difficult to position the third link in anyway other than generally parallel the longitudinal axis of the vehicle due to driveshaft interference.

Furthermore,when closely observing the average production automobile that is equiped with a rear seat, it becomes quite obvious that there is no room to mount a third link because the rear seat is taking up the space.

To be more specific about the three-link and four-link suspensions as applied to the typical automobile or truck which utilize a rigid rear drive axle. These vehicles incorporate a front mounted engine with attached transmission connected by way of a driveshaft to a rigid rear drive axle. When attaching this rear drive axle to the vehicle chassis it becomes necessary to point out that a pair of the connecting links of either the three or four-link type of suspensions are usually located with one link near each end of the axle, and both links being on the same horizontal plane, either above or below the axle centerline. This pair of connecting links when set up in the vehicle's suspension should be positioned parallel to the level ground and normally parallel to each other as well. This is to insure neutral steer of the rear axle to make for a more predictable and stable vehicle to control in high-performance cornering or high-speed driving situations. Thus, the other one link in a three-link or two links in a four-link system are all that is left to make suspension setup and tuning adjustments.

Now to show an example of usually automobiles in particular. To leave the bottom pair of links roughly parallel to the ground and vehicle longitudinal axis is what works well for most automobiles due to chassis or body mounting locations or clearance considerations. This becomes apparant when looking at the first embodiment of the invention.

To set the remaining link(s) at a variety of angles pointing downward from the top of the rear axle toward the bottom of the chassis, forward of the rear axle, is the essence of suspension setup and tuning adjustments for most sports car and race car applications. Any of the various angles from parallel the bottom links to the highest degree feasible of the downward angle of the upper link(s) is what is normally desireable. Rarely if ever is (are) the upper link(s) pointed in an upward direction from the top side of the rear axle, as reasons to follow in the next paragraph.

The higher the degree of downward angle of the upper connecting link(s) serves one probably two purposes: 1) lessens wheel hop of the rear tires under hard acceleration, due to the torque of the powered rear axle pulling up on the vehicle chassis and thereby planting the rear tires harder on the ground; and 2) theoretically under hard braking, deceleration forces acting on the rear axle allows the reverse torque generated to press down on the vehicle chassis thereby reducing the amount of rear body lift while slowing down, thus making for a shorter stopping distance and less chance of rear wheel lockup or skid.

Now apply the limitations of the three-link and four-link suspensions as previously described, and we're back to square one. Therefore, a solution is needed that would overcome the shortcomings of the two before mentioned types of rigid axle link attached suspensions and many other types not mentioned as well.

OBJECTS AND ADVANTAGES

Accordingly several objects and advantages of the invention are as follows:

a) to provide a suspension that locates and stabilizes a rigid axle of a vehicle from forces acting on the axle in fore, aft, and rotational directions;

b) to provide a suspension which allows for free mobility up or down of either end of a rigid axle without the other end having to do the same, through the full range of suspension travel, and not encountering suspension bind in the process;

c) to provide a suspension that utilizes multiple, pivotal connecting links and a swivel to attach a rigid axle to a vehicle's chassis;

d) to provide a suspension as described in the above, that permits the use of a substantially hard material, such as a metal or alloy, to be used in the composition of the bearings at the pivotal ends of all connecting links; optimumly, a spherical rod end bearing would be the preferred type of pivotal link end bearing;

e) to provide for a plethora of different mounting directions, lengths, angles, and degrees of incline of the frame to axle links; to allow for nearly infinate suspension setup and tuning adjustments while maintaining a bind free suspension as described before;

f) when the invention is incorporated on a rear, powered axle as in the first embodiment of the invention; to provide for a reduction or elimination of rear wheel hop when the vehicle is under hard acceleration, thereby, increasing traction of the rear tires; this is due to the axle torque generated being transmitted to the frame or chassis of the vehicle in a lifting force, by way of the downward angle of the upper links, thus, pressing the rear tires harder on the ground;

g) another advantage when positioning the upper links in a downward angle forward from atop the rear axle as described in (f) above becomes evident; as the reverse torque generated by the axle, powered or not, under hard braking, theoretically, should reduce the amount of rear body lift of the vehicle, thereby, allowing for a shorter stopping distance and less chance of rear wheel lockup or skid; this, because of the subsequent increase percentage of vehicle body weight transferred to the rear tires.

Further objects and advantages of the invention will become apparent from a consideration of the drawings and ensuing description.

BRIEF DESCRIPTION OF THE DRAWINGS

Some figures have two parts as denoted by the capitol letter suffix after the numeral of the figure. Also, some figures depicting various four-link suspension setups have the latteral and vertical suspension members omitted to preserve clarity and ease of understanding of the drawings.

Reference Numerals in Drawings

| | |
|---|---|
| 20 vehicle body | 72 locking disc for bolt |
| 22 rigid drive axle | 74 swivel arm axis bearing |
| 24 swivel assembly | 76 swivel arm axis bore |
| 26 swivel arm | 78 quadrilateral opening |
| 28 swivel mount (all sections) | 80 link end bearing spacer |
| 28B swivel mount base section | 82 aperatures for bolt |
| 28T swivel mount top section | 30 longitudinal frame |
| 28M swivel mount middle section | 32 transverse frame |
| 68 center pivot bolt | 34 coil-over cross-member |
| 70 threaded bore or nut | 36 drive shaft |
| 38 upper connecting link | 128 swivel mount base |
| 40 lower connecting link | 148 end stud |
| 42 Panhard bar | 168 swivel pivot shaft |
| 44 coil-over shock | 170 securement fastener |
| 46 spherical rod end bearing | 172 retainment washer |
| 48 fastening bolt | 326 swivel arm variant |

-continued

| Reference Numerals in Drawings | |
|---|---|
| 50 fastening nut | 376 swivel arm axis bore |
| 52 upper link frame bracket | 348 link end bearing shaft |
| 54 lower link frame bracket | 350 pivotal bearing cup |
| 56 upper link axle bracket | 352 bearing cup pivot bolt |
| 58 lower link axle bracket | 354 nut or threaded bore |
| 60 Panhard bar axle mount | 356 spacer bearing |
| 62 Panhard bar frame bracket | 358 securement screw |
| 64 coil-over axle mount | 224 swivel assembly variant |
| 66 coil-over frame bracket | 424 swivel assembly variant |
| 122 non-powered rigid axle | 226 swivel arm variant |
| 124 stud end swivel assembly | 426 swivel plate |
| 126 stud end swivel arm | 446 ball joint |

DETAILED DESCRIPTION OF THE FIRST EMBODIMENT

Figure 1:
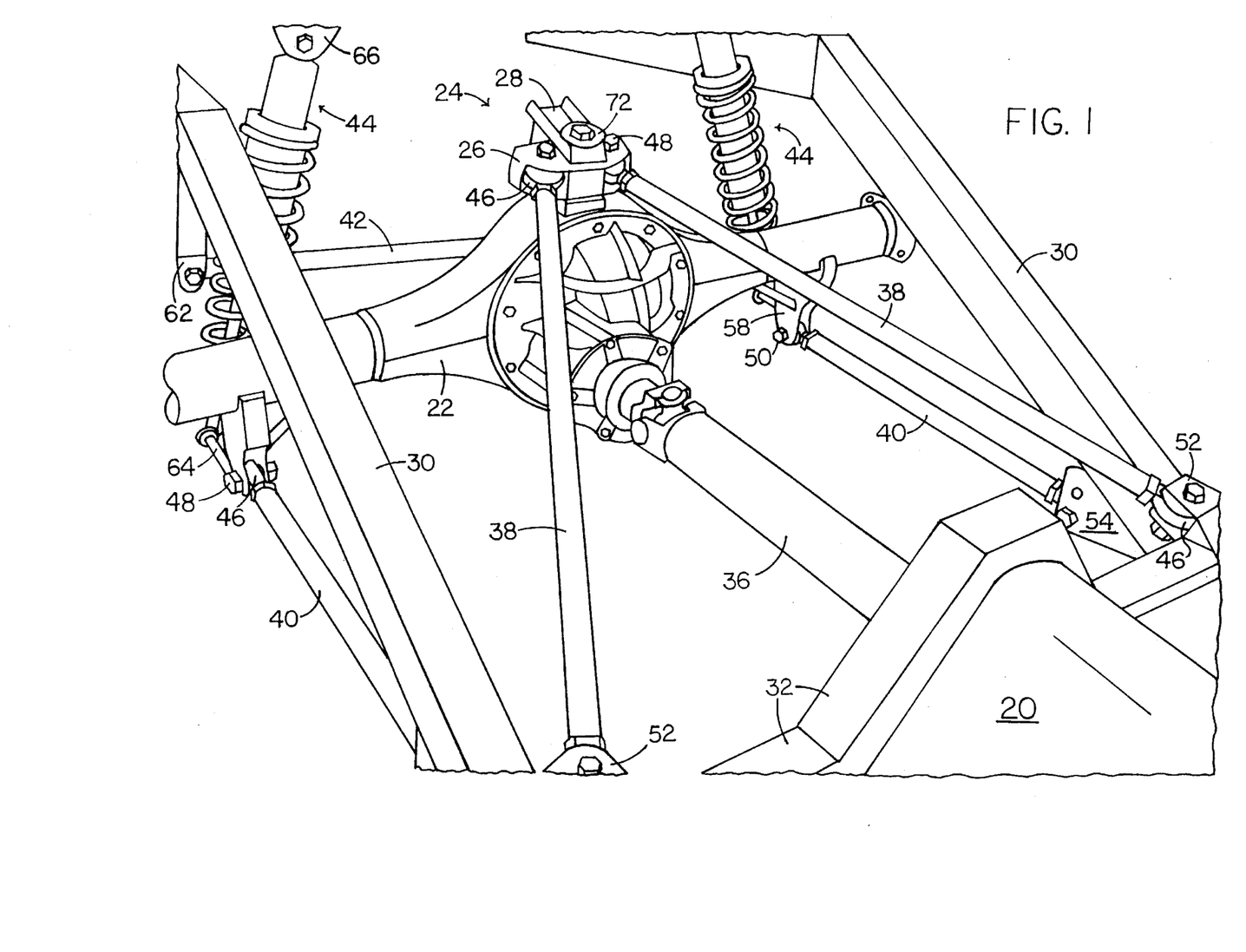
FIG. 1 is a perspective elevational view of the entire rear suspension along with some vehicle framework of the first embodiment of the invention as seen from a position about passenger door level hight looking rearward and down at the rear suspension.
Figure 2:
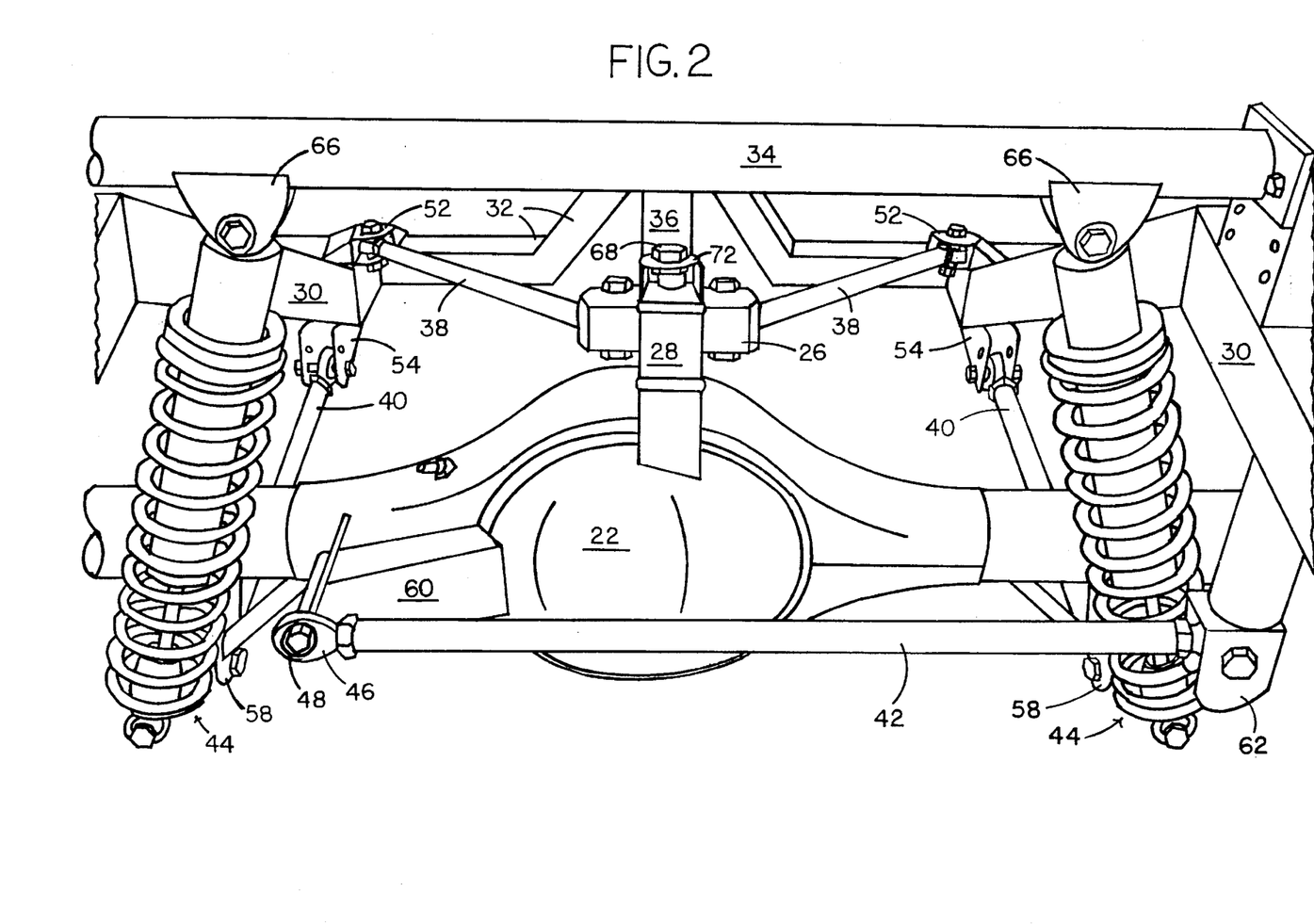
FIG. 2 is a perspective elevational view of the same suspension as in FIG. 1 except as seen from a vantage point just inside the trunk opening looking down and forward at rear suspension.

Referring now to the drawings, particularly FIGS. 1 & 2, the first embodiment of the invention is shown. At the focal point is a rigid drive. axle housing 22 with all the various essential suspension components attached to allow the vehicle to travel over ground, less tires and wheels (not shown).

Positioned atop middle of axle housing 22 is a swivel assembly 24 which is securely attached to axle 22 by a welding process or other attaching means if axle cannot accept welding. At each end of swivel arm 26 is an upper connecting link 38 which is pivotally attached to an end of swivel arm 26 by a spherical rod end bearing 46 as are the ends of all connecting links. The other end of each upper link 38 is pivotally attached to vehicle frame 30 or transverse frame 32 by way of a bracket mount 52. Underneath and evenly spaced from the ends of axle 22 are a pair of lower connecting links 40. Each lower link 40 is pivotally attached at one end to axle 22 by way of bracket 58. The other end of each link 40 is pivotally attached to frame 30 by way of bracket 54. The foregoing information in this paragraph describes the fore, aft, and rotational stabilizing and locating means for axle 22.

This suspension invention needs an axle locating and stabilizing device in the lateral direction to operate effectively, such as a Panhard bar, Watts linkage, diagonal link, etc. FIGS. 1 & 2 show a Panhard bar 42 for ease of illustration and assembly. Panhard bar 42 is pivotal at each of its connecting ends by a spherical rod end bearing 46. One end of bar 42 is pivotally attached to axle 22 by way of axle mount 60. The other end of bar 42 is pivotally attached to a frame member 30 by way of a mounting bracket 62.

Obviously a type of spring and shock absorber is needed to control the vertical movement of the axle and provide a suitable vehicle ride. There are a large variety of spring and shock combinations that can be utilized with this invention. FIGS. 1 & 2 show a pair of coil spring over shock absorber units 44 for clarity of drawings and ease of vehicle ride hight adjustment. Each coil over shock 44 is pivotally attached at one end to axle 22 by an axle mount 64. The other end of each coil over shock 44 is pivotally attached to frame cross member 34 by way of a bracket 66.

Figure 3:
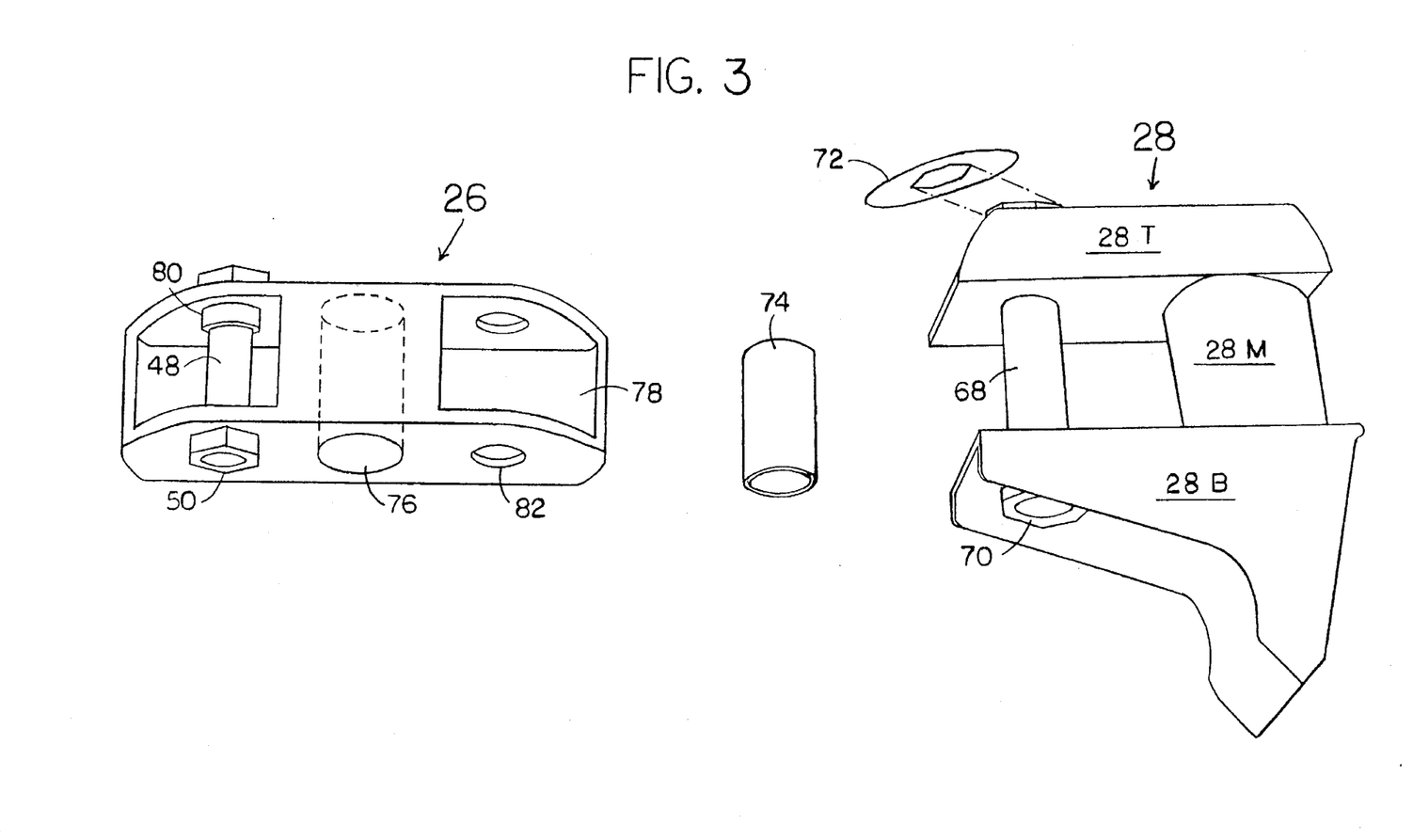
FIG. 3 is a detailed perspective view of the parts of the swivel assembly of the first embodiment of the invention.

FIG. 3 is a more detailed illustration of the individual components of partially diassembled swivel assembly 24 in perspective view of the first embodiment. Swivel 24 components should be constructed from a substantially strong material, such as a metal or alloy. The first embodiment of swivel mount 28 encompasses three welded together sections. A swivel mount base 28B is contoured on its bottom to fit axle housing 22 and accept a welding process. A swivel mount top section 28T is positioned parallel and aligned with base 28B. Base 28B and top 28T are secured together by welding an intermediate or middle section 28M between them, and is positioned to the rear of mount 28 to allow space for swivel arm 26 to pivot. A swivel arm pivot and securement bolt 68 passes through a hole in top 28, and threads are cut into a receiving bore in base 28B,or a nut 70 is positioned underneath and can be welded to base 28B. Bolt 68, both secures arm 26 to mount 28, and allows pivoting of arm 26. A bolt locking disk 72 is contoured to closely fit the head of bolt 68 and can be tack welded or screwed to swivel mount top 28T in order to prevent bolt 68 from becoming loose and falling out.

At the middle of FIG. 3 is a swivel axis pivot bearing 74, which inserts in swivel arm center bearing bore 76, and through which bolt 68 passes to connect swivel arm 26 to mount 28.

On the left side of FIG. 3 is arm 26. At the middle of arm 26 is pivot axis bearing bore 76 shown in hidden detail by broken line with its bottom opening visible from this view. At each end of arm 26 is a large contoured quadrilateral opening or hollow 78 which accepts a link end bearing 46 of upper link 38 as depicted in FIG. 1. Now turning back to FIG. 3, notice that one quadrilateral opening 78 shows a link end fastening bolt 48, nut 50, and spacer 80 installed. The other opening 78 shows two apperatures 82 through which bolt 48 passes when securing link end bearing 46 in opening 78 of arm 26.

GENERAL OPERATION OF THE INVENTION

The operation is rather simple. Referring to FIGS. 1 & 2: swivel arm 26 pivots about its axis, bolt 68 of mount 28, permitting one end of rigid axle 22 to move up or down freely within the range of coil-over shock 44 on that side, and without the other axle end having to do the same; through the full range of suspension travel, and without encountering any suspension bind.

The cause of the pivoting motion of swivel arm 26, is the difference in reach range of each of the upper links 38, where one link pushes past and the other link pulls away from the swivel pivot axis. This is a direct result of the axle 22 being tilted from side to side, or when the vehicle leans to its side, perhaps while cornering.

The main purpose of the lower links 40 is to help keep the axle 22 aligned with the vehicle body 20 in fore, aft, and rotational directions.

The preceding operation section applies to all of the embodiments. The noticeable differences of swivel design variants or mounting locations do not affect the swivel action. The results are the same regardless of mounting location or design.

DESCRIPTION OF THE OTHER EMBODIMENTS

Before I describe the figures of the other embodiments I have illustrated, let me make clear a few points: for starters, the other embodiments depicted for the most part, show only the bare essentials of the invention in various forms; the lateral axle locating and stabilizing means, such as a Panhard bar, is not shown; the vertical vehicle suspension, such as a spring and shock absorber, is not shown; nor are, some transverse frames (where connecting link brackets might attach),tires and wheels, brakes, and vehicle body, shown.

The type of connecting link end bearing that may be employed is not shown in detail. The above mentioned items in this paragraph are omitted to preserve clarity and ease of understanding of the drawings. Also, lest I forget, the connecting link pair that do not attach to the swivel often are shown just to the inside of the longitudinal frames, where in actuality they may be located directly under, or to the outside of, the frames if space for movement permits.

Next, let me explain that the figures are only examples of what could be, and that many of the forms of parts can be altered, mixed, or substituted with other parts to suit the individual application. For example: any type of swivel arm can be modified to fit any type of swivel mount, or pivot axis, and vice versa; swivel arms can be altered to accept a variety of connecting link end bearings; and, any type of swivel assembly can be made to fit any type of rigid axle (i.e. powered drive axle, or non-powered axle), as well as any type of frame or chassis (when swivel assembly is mounted to the frame).

Figure 7:
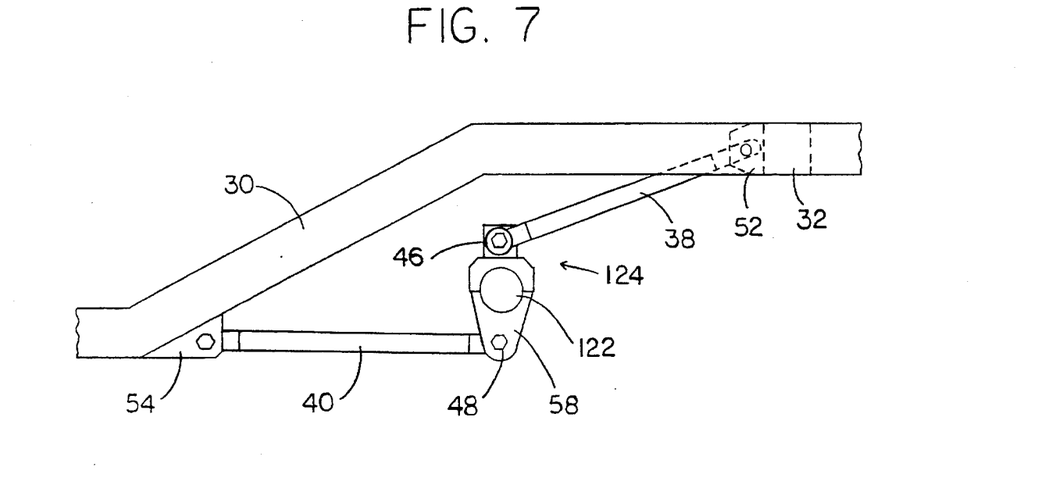
FIG. 7 is a side view depicting a non-powered rigid axle, longitudinal and transverse frames, upper and lower links, and a swivel mounted atop the axle connecting to reverse mounted upper links.
Figure 7A:
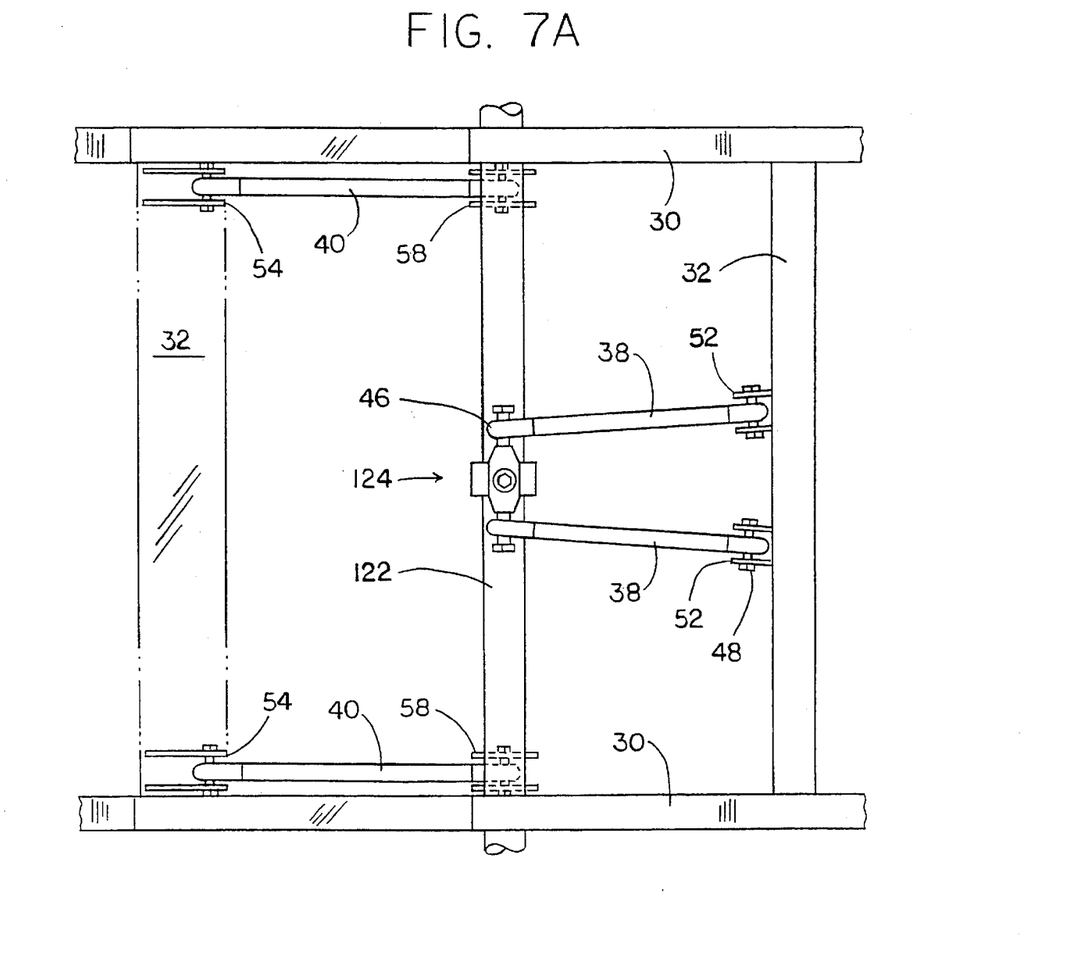
FIG. 7A is a plan view showing the embodiment of FIG. 7.

Furthermore, the invention can be applied to the front, rear, or intermediate rigid axle of a vehicle, be it an axle with steerable wheels, or fixed direction wheels rotatable on its axis. The angles of the connecting links can be varied from what is shown in the drawings. As well, the direction of the links mounted above the axle centerline can be positioned pointing in an opposite direction of the links below, or vice versa, as shown in FIGS. 7 & 7A.

Figure 4:
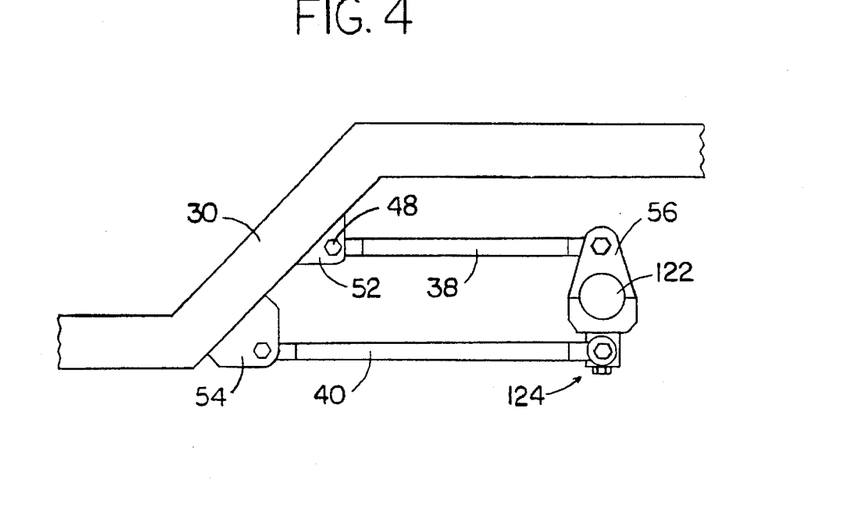
FIG. 4 is a side view depicting a rigid non-powered axle, longitudinal frames, upper and lower connecting links, and a swivel mounted underneath axle and connected to lower link ends.
Figure 4A:
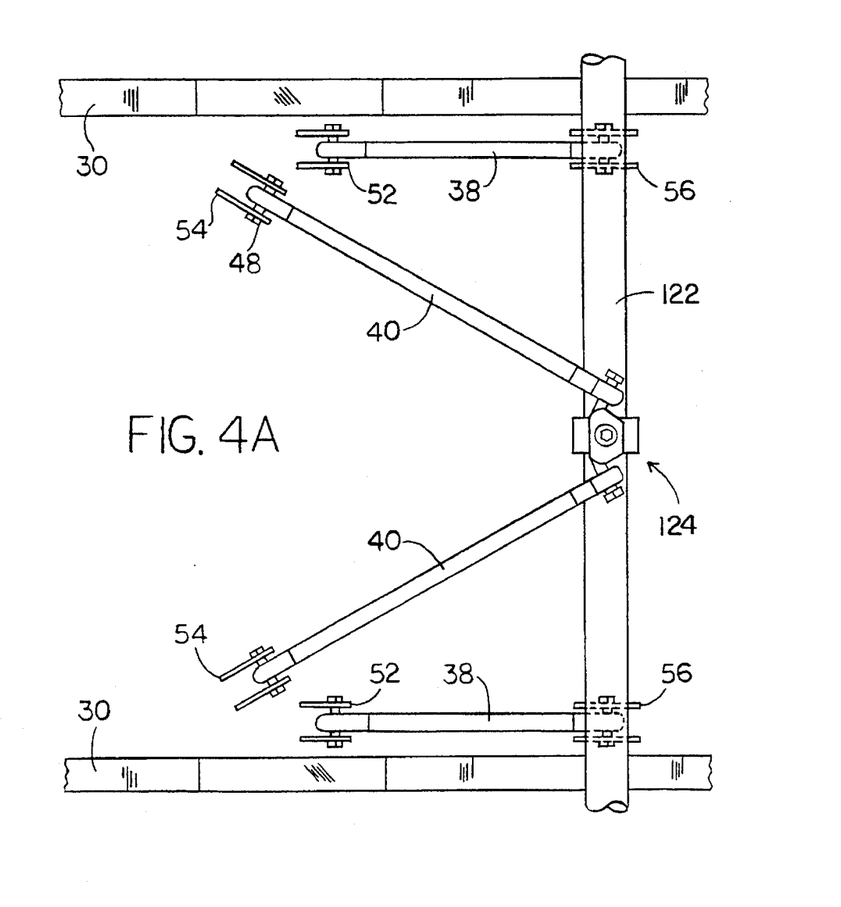
FIG. 4A is a bottom view looking up at the suspension of FIG. 4.
Figure 9:
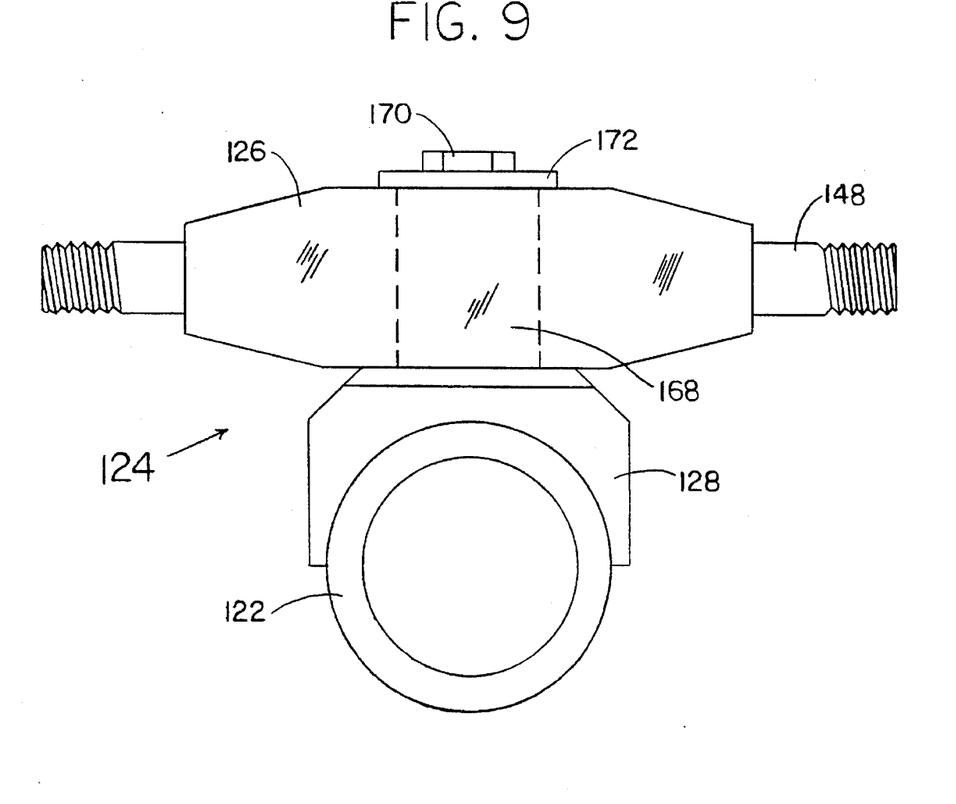
FIG. 9 is an elevational view of a variation of swivel assembly as seen from the side with the swivel arm pivoted 90 degrees on its' axis to show detail.

Now, referring to FIGS. 4 & 4A, power accepting rigid axle 22 is now a non-powered rigid axle 122. Swivel assembly 124 is located underneath axle 122, and is a variation of swivel assembly 24 as shown in the first embodiments of FIGS. 1, 2, and 3. FIG. 9 shows a close-up of swivel assembly 124.

Figure 5:
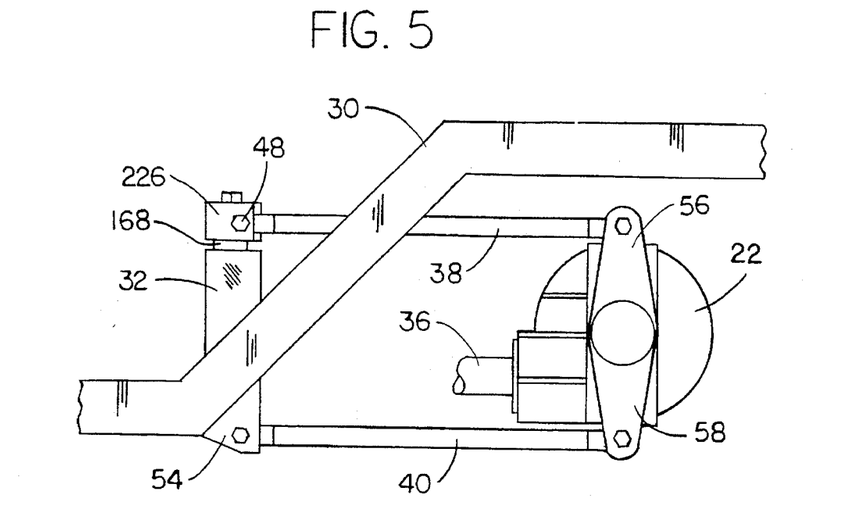
FIG. 5 is a side view showing a rigid drive axle, longitudinal and transverse frames, upper and lower links, and a swivel mounted to transverse frame and connected to the upper links.
Figure 5A:
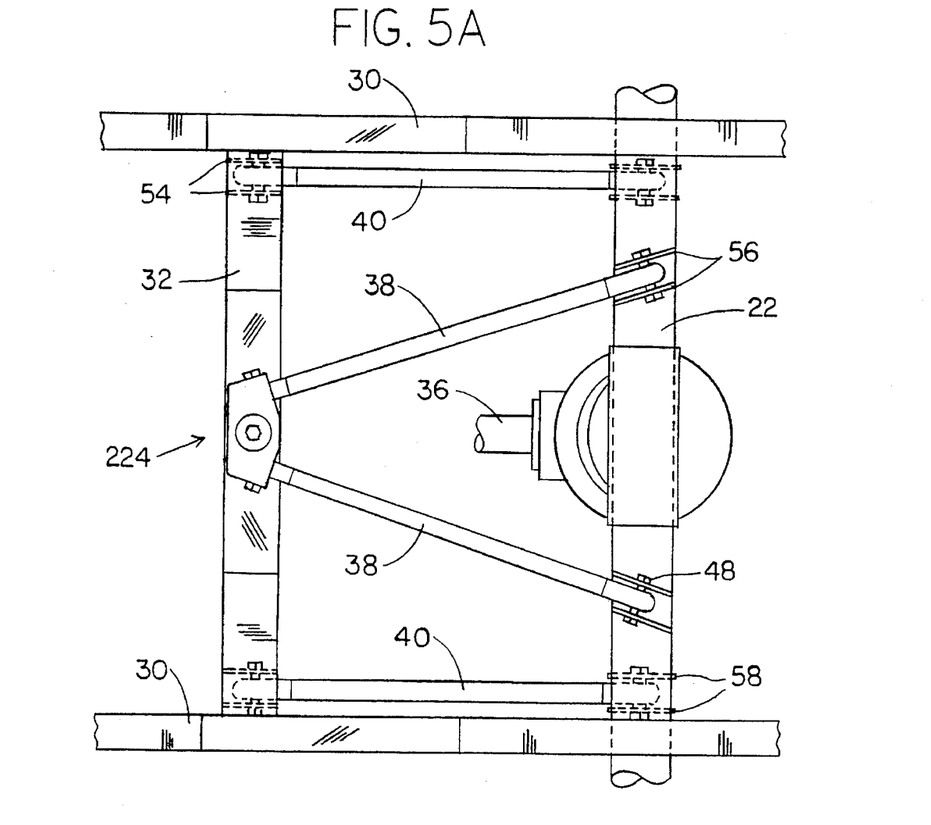
FIG. 5A is a plan view of the embodiment of FIG. 5.

The main differences in FIGS. 5 & 5A over the first embodiment is that swivel assembly variant 224 is now mounted on the vehicle chassis, at the middle of transverse frame 32, though still attaching to upper links 38 only at the opposite ends. Upper link brackets 56 attach to the top side of axle 22 at two opposite locations, evenly spaced from the middle of axle 22 laterally.

Swivel arm variant 226 has two distinct differences: a) arm 226 attaches to frame 32, and pivots on its axis, by way of an enlarged swivel pivot shaft 168; and b) the mounting angle of the ends of links 38 is now 90 degrees on their sides or perpendicular to pivot shaft 168, as can be seen by the head of bolt 48.

Note drive shaft 36 in FIGS. 1, 2, 5, 5A, 6, and 6A if for no other reason than to show it has been mentioned.

DESCRIPTION OF THE OTHER EMBODIMENTS

Figure 6:
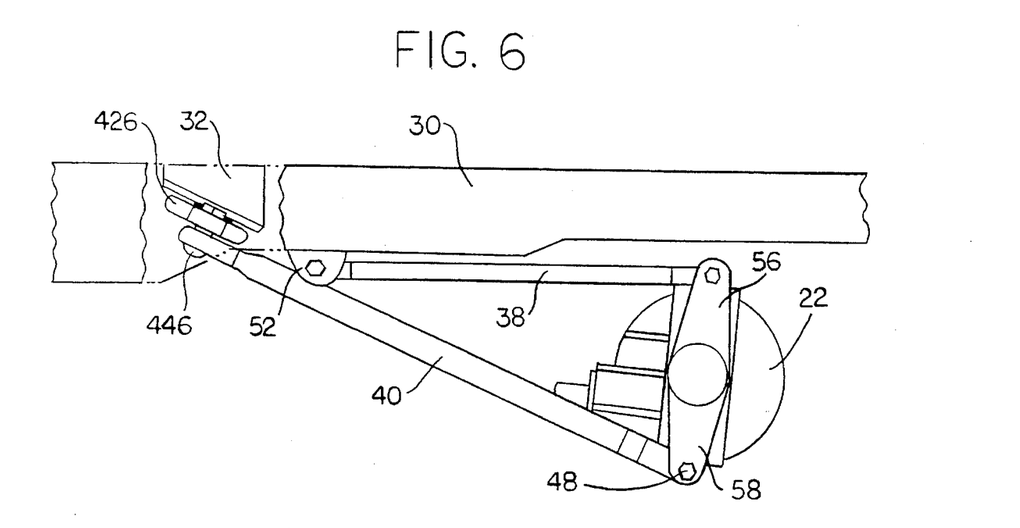
FIG. 6 is a side view of what might be considered a truck frame depicting a rigid drive axle, longitudinal and transverse frames, upper and lower links, and a swivel mounted to the underside of transverse frame and connected to the lower links.
Figure 6A:
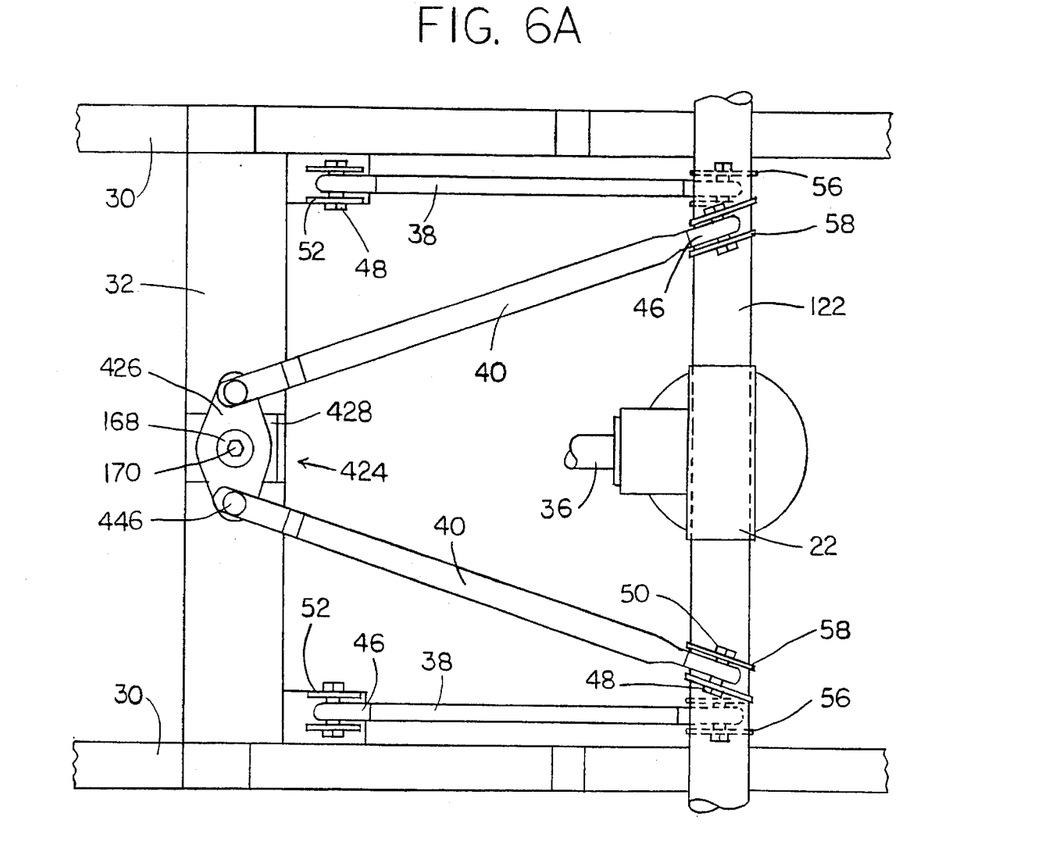
FIG. 6A is a bottom view looking up at the embodiment of FIG. 6.

FIGS. 6 & 6A show a side and bottom view respectively of yet another invisioned embodiment of the invention. One main difference in these two drawings is that longitudinal frames 30 resemble that of the truck frame variety. Lower links 40 are now enlarged and lengthened and have become the swivel attaching pair. Swivel assembly variant 424 is attached to the underside, and lateral middle,of transverse frame 32 by way of mount base variant 28. Swivel plate 426 pivots on and is held secure to base 428 by enlarged pivot shaft 168. Securement bolt 170 and retainment washer 172 (shown in FIG. 9) keep plate 426 from becoming loose and falling off shaft 168. Links 40 attach to plate 426 by way of ball joints 446 in this situation. The embodiment depicted in FIGS. 6 & 6A is also a good example of the invention as applied to a trailer axle, as denoted by the broken line through the middle section of powered axle 22, thus becoming non-powered axle 122 as shown in FIG. 6A.

FIGS. 7 & 7A show a side view and top view of an embodiment, where the most noticeable difference is the reverse mounted direction of the upper links 38. Swivel assembly 124 attaches to the top side of axle 122. Upper links 38 extend from swivel 124 in an opposite direction from lower links 40 and attach to a transverse frame 32. Conversely, lower links 40 extend from the underside of axle 122 in a direction consistent with the suspensions shown in the other figures, and attach to the underside of the other transverse frame 32 or longitudinal frame 30. The swivel assembly in this rather unusual suspension can be located in as many positions as in the preceding drawings.

Figure 8:
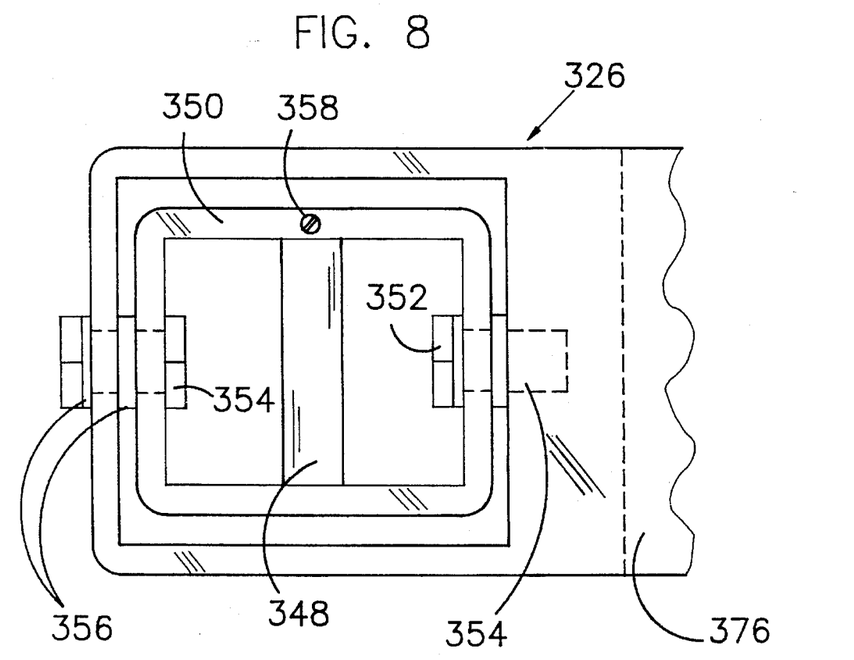
FIG. 8 shows a front or rear view of an end half of a variation of swivel arm as divided down the center axis bore.
Figure 8A:
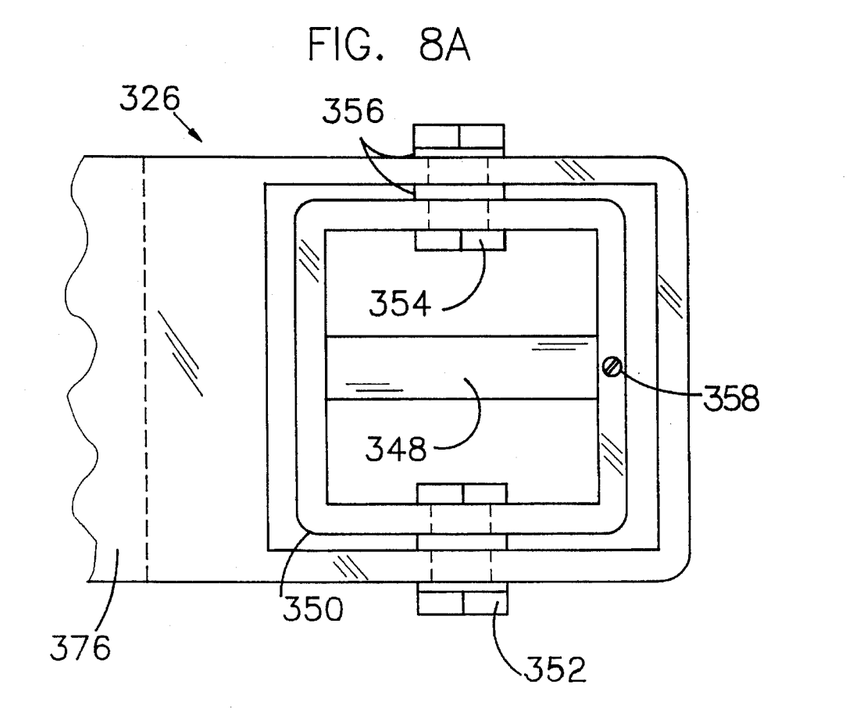
FIG. 8A is a view of an embodiment quite similar to that of FIG. 8, the only difference being; it is the other end half of swivel arm, and the pivotal cup is mounted 90 degrees on its side.

FIGS. 8 & 8A are an end half each of swivel arm 326 as divided up the center of pivot axis bore 376. These two figures depict basically a universal type of joint utilized where a connecting link end is not a multi-positioning pivotal about a sphere type of connecting link end like spherical rod end bearing 46 or balljoint 146. Swivel arm 326 as shown in frontal or rear view in FIGS. 8 & 8A permits the use of a connecting link end bearing or bushing that is pivotal abut one plane of movement only, and thus permits free movement (like spherical bearing 46, or ball joint 146) without bind when employing this type of link end bearing. A universal type joint like this should be employed at all other connecting link end brackets to insure bind-free suspension when using link ends that are pivotal about one plane of movement only, unless an elastomeric bearing or bushing is utilized in the connecting link end, as this would have flex which would allow some degree of link movement out of line of the single plane of link swing.

A detailed description of the parts of FIGS. 8 & 8A can be explained at the same time since both share the same part numbers. The view of FIGS. 8 & 8A is that of the front or rear of swivel arm 326. The minor difference of FIG. 8A over FIG. 8 is that the pivotal link end bearing cup 350 is tuned 90 degrees on its side.

An end half of swivel arm 326 is divided from the other end half by a curvy line down the center of pivot axis bore 376 (shown in broken line) and seperating FIG. 8 from FIG. 8A. There is a large quadrilateral opening near each end of arm 326 which houses a pivotal bracket or cup 350 for a link end bearing. Inside each cup there is a link end bearing shaft 348 held in place by a retainment screw 358. Cup 350 is secured to and pivots in arm 326 by way of two cup pivot bolts 352. Each bolt 352 is secured at the other end by a threaded bore or nut 354. There are two spacer bearings 356 for each bolt 352. These spacer bearings 356 provide for reduced friction and eliminate play in cup 350.

The final FIG. 9 depicts stud end swivel assembly variant 124 in closeup. Swivel assembly 124 is shown in some of the other figures in less detail. Basically FIG. 9 is a collaboration of as many variations of the first embodiment (shown in detail in FIG. 3) as I could put into one design.

In FIG. 9 swivel arm 126, shown in front or rear view, has a stud 148 protruding from each of its opposite ends. Stud 148 is used to attach a link end bearing to each end of swivel arm 126. Swivel arm 126 pivots about an enlarged pivot shaft 168 shown hidden by two broken lines up the middle of arm 126. Atop the middle of arm 126 centered over pivot shaft 168 is retainment washer 172. Directly above washer 172 sits the head of securement fastener 170 which screws into the top of shaft 168, preventing arm 126 from becoming loose and falling off. At the bottom of arm 126 is swivel mount base 128 from which shaft 168 protrudes and arm 126 pivots on. Mount base 128 and nonpowered rigid axle 122 are turned 90 degrees to the side horizontally to show end view of axle 122.

While concentrating on swivel assembly design refer back to FIG. 3 for ease of understanding of the following possibilities in this paragraph. There are many other methods of design and manufacture of the swivel assembly parts. Swivel mount 28, for example, could be cast and machined (instead of welded sections), or machined from a solid chunk of billet steel, or forged. In the event that the type of rigid axle housing makes for difficult mounting of the swivel assembly, such as a cast center gear housing section, swivel mount 28 can be integrally cast with center gear housing section at time of production.

CONCLUSION, RAMIFICATIONS, AND SCOPE

To name a few types of vehicles which have come to mind that could benefit from the application of this invention, not to exclude any not mentioned, are as follows: automobiles, trucks, buses, big rig semis, trailers of all types; construction vehicles such as dump trucks, earthmovers, graders, skiploaders, bulldozers, cranes; many different types of military vehicles like tanks, etc.; farm equipment such as combines and tractors; off-road vehicles, amphibious vehicles, swamp buggies, trains, aircraft landing gear, even scale model radio controlled vehicles.

Some other types of vehicles that might benefit from the application of this invention which travel over a surface like water, ice, snow, or sand, and that utilize something other than wheels at the rigid axle ends, are as follows: vehicles that utilize tracked suspensions, like tanks, bulldozers and snowmobiles; vehicles that utilize skids, skis, or blades at the axle ends like snowmobiles, some kinds of helicopters and planes; vehicles equipped with pontoons; outrigger hulls i.e. catamaran and trimaran; even possibly hydrofoils for the water vessels equipped with them.

Vehicles of special benefit, and those for which most of the embodiments of the invention were primarily conceived for, would be the race prepared versions of cars and trucks driven on all types of racing circuits, like: road race courses, rally courses, paved and dirt oval tracks, superspeedways, drag strips, and off-road race courses. Although, many factory stock production street driven passenger cars, sports cars, light trucks, and four wheel drive vehicles, can benefit highly by utilizing this invention as well.

In conclusion, although the before mentioned description contains many specifities, these should not be construed as limitations of the invention, but rather as some exemplifications of embodiments thereof. Many other variations are possible without departing from the scope of the invention.

The invention as claimed is:

1. In a suspension for a ground vehicle comprising: a lower pair of links pivotally attached at one end each to a rigid axle below the axle centerline, and an upper pair of links pivotally attached at one end each to said rigid axle above said axle centerline; both pair of links extending from said rigid axle normally within a predetermined number of degrees of parallel to the longitudinal axis of the vehicle and are pivotally attached at their other end each to the chassis of said vehicle; thereby said suspension stabilizes said rigid axle in fore, aft, and rotational directions;

the improvement to which comprises a swivel arm, having two ends, and interposed between a pair of links at the same attaching end of each link, so that one end of each link attaches to a corresponding end of said swivel arm; said swivel arm having a pivot axis which is securely affixed to a surface in between the locations where the attaching ends of said pair of links would otherwise attach to said surface;

whereby said swivel eliminates any bind in said suspension by permitting one link of said pair of links to push past, and the other link to pull away from the pivot axis center and vice versa; this action occurs when said rigid axle tilts from side to side in relation to the vehicle's body, and normally in response to said vehicle traversing uneven terrain or leaning as when rounding a curve.

2. The suspension of claim 1 wherein said swivel arm is interposed between said upper pair of links at the axle attaching ends, and said pivot axis being securely affixed to the above centerline surface of said rigid axle.

3. The suspension of claim 1 wherein said swivel arm is interposed between said lower pair of links at said axle attaching ends, and said pivot axis being securely affixed to the below centerline surface of said rigid axle.

4. The suspension of claim 1 wherein said swivel arm is interposed between said upper pair of links at the chassis attaching ends, and said pivot axis being securely affixed to a chassis surface of said vehicle.

5. The suspension of claim 1 wherein said swivel arm is interposed between said lower pair of links at said chassis attaching ends, and said pivot axis being securely affixed to said chassis surface of said vehicle.

6. The suspension of claim 1 wherein said rigid axle is a power accepting rigid drive axle.

7. The suspension of claim 1 wherein said rigid axle is a non-powered rigid axle.

8. In a suspension for a ground vehicle comprising: four connecting links having two opposite pivotally attachable ends each, to connect a rigid axle to a chassis of the vehicle, and stabilize said rigid axle in fore, aft, and rotational directions.

wherein the improvement comprises a swivel arm interposed between two of the links at the axle attaching end of each link; said swivel arm having two opposite ends and an intermediate pivot axis which is steadfastly attached to said rigid axle normally between the locations where the two links would attach otherwise; said axle attaching ends of said two links attach to a corresponding end each of said swivel arm;

whereby the pivoting motion of said swivel arm allows one link of said two links to pull from, and the other link of said two links to push beyond, the center of said pivot axis, and vice versa; thereby freeing said suspension from bind when one axle end moves up or down at a different rate than the other axle end; this occurs usually in response to said vehicle traversing over uneven terrain or leaning as when negotiating a change of direction.

9. The suspension of claim 8 wherein said rigid axle is a powered drive axle.

10. The suspension of claim 8 wherein said rigid axle does not accept power to drive vehicle along.

11. In a vehicle having a suspension of the type which comprises four connecting links, each link having two opposite pivotally attachable ends; one end of each said link attaches to a rigid axle of said vehicle, and the other end of each said link attaches to a chassis of said vehicle; thus stabilizing said rigid axle from forces acting on it in fore, aft, and rotational directions;

wherein the improvement comprises a swivel arm having two opposite attachable ends and an intermediate pivot axis; said swivel arm being interposed between the chassis attaching ends of two of the links, so that one end of each link attaches to a corresponding end of said swivel arm; said pivot axis is steadfastly affixed to said chassis normally between the previous chassis attaching locations of the two links;

whereby the swivel prevents bind from occurring in the suspension by its pivoting motion when one of the two attaching links pushes beyond, and the other link pulls from, the center of said pivot axis, and vice versa; this action takes place as a result of one end of rigid axle being moved up or down without the other end doing the same; this occurs usually in response to the vehicle traversing uneven ground or leaning as when changing course while moving.

12. The suspension of claim 11 wherein said rigid axle is a power driven rigid axle.

13. The suspension of claim 11 wherein said rigid axle is the type which does not accept power to drive the axle.

* * * * *